United States Patent [19]
Nishigaki et al.

[11] Patent Number: 5,557,422
[45] Date of Patent: Sep. 17, 1996

[54] RECORDING METHOD AND APPARATUS FOR PROGRAMMING A RECORDING SCHEDULE

[75] Inventors: Tetsuo Nishigaki, Kanagawa; Takamichi Mitsuhashi, Saitama; Takamichi Yoshidaa, Tokyo, all of Japan

[73] Assignee: Sony Corporation, Tokyo, Japan

[21] Appl. No.: 334,427

[22] Filed: Nov. 4, 1994

Related U.S. Application Data

[63] Continuation of Ser. No. 76,169, Jun. 14, 1993.

[30] Foreign Application Priority Data

Jun. 30, 1992 [JP] Japan ..................... 4-173436

[51] Int. Cl.⁶ ............................. H04N 5/76; G11B 8/00
[52] U.S. Cl. ................................. 358/335; 360/72.1
[58] Field of Search ..................... 358/335, 310, 358/342; 360/32, 33.1; 348/114, 211

[56] References Cited

U.S. PATENT DOCUMENTS

| | | | |
|---|---|---|---|
| 4,763,195 | 8/1988 | Tults | 348/732 |
| 4,977,655 | 12/1990 | Young | 358/142 |

FOREIGN PATENT DOCUMENTS

| | | | |
|---|---|---|---|
| 2005070 | 6/1990 | Canada . | |
| 0373297 | 6/1990 | European Pat. Off. | H04N 7/087 |
| 0486988 | 5/1992 | European Pat. Off. | H03J 1/00 |
| 3615196 | 8/1987 | Germany | H04N 5/50 |
| 63-232755 | 9/1988 | Japan | H04N 5/00 |
| 2256333 | 12/1992 | United Kingdom | H04N 5/782 |
| 2256546 | 12/1992 | United Kingdom | H04N 5/782 |

OTHER PUBLICATIONS

Lerch, "Senderprogrammierung mit ATS–Plus," 11 Radio Fernsehen Elektronik, vol. 40, No. 11 at 677–679 (Berlin 1991).

Zeisel et al., "An Interactive Menu–Driven Remote Control Unit for TV–Receivers and VCR Recorders," IEEE 1988 International Conference on Consumer Electronics, Digest of Technical Papers, Rosemont, Illinois, at 288–289 (Jun. 1988).

Primary Examiner—Thai Q. Tran
Assistant Examiner—Robert Chevalier
Attorney, Agent, or Firm—Jay H Maioli

[57] ABSTRACT

Channel selecting operation of a tuner is controlled by a VTR microprocessor. A broadcasting station code detected by a broadcasting station code detector from an output video signal SV from the tuner is supplied to the VTR microprocessor. To the VTR microprocessor, there are connected a first memory which stores, in advance, data representing the corresponding relationship between broadcasting station codes and VCR+ guide channels, and a second memory which stores data representing the corresponding relationship between channels selectable by the tuner and the VCR+ guide channels. When an automatic setting key on a remote control commander or a key input circuit is pressed, the VTR microprocessor controls the tuner to select channels successively, reads VCR+ guide channels corresponding to the broadcasting station codes detected by the broadcasting station code detector from the first memory, and writes the VCR+ guide channels in the second memory in relation to the channels selected by the tuner.

4 Claims, 11 Drawing Sheets

| Bit | Field |
|---|---|
| 0, 1 | ADDRESS |
| WORD 11: 2,3,4,5,6 | DATE BINARY |
| WORD 11: 7 / WORD 12: 0,1,2 | MONTH BINARY |
| WORD 12: 3,4,5,6,7 | TIME BINARY |
| WORD 13: 0,1,2,3,4,5 | MINUTE BINARY |
| WORD 13: 6,7 / WORD 14: 0 | NATIONALITY BINARY |
| WORD 14: 1,2,3,4,5,6,7 | BROADCASTING STATION CODE BINARY |

FIG. 8
COMMANDER

RECORDING METHOD AND APPARATUS FOR PROGRAMMING A RECORDING SCHEDULE

This is a continuation of application Ser. No 08/076,169 filed Jun. 14, 1993.

BACKGROUND OF THE INVENTION

1. Field of the Invention

The present invention relates to a recording apparatus such as a video tape recorder capable of programming a recording schedule using a VCR+ code (Video+ code).

2. Description of the Related Art

There has been proposed a video tape recorder (VTR) capable of programming a recording schedule using a VCR+ code. The proposed VTR operates as follows: When the VTR receives a VCR+ code, it decodes the VCR+ code to obtain a date/time at which a broadcast program starts, a time at which the broadcast program ends, and a VCR+ guide channel (second broadcasting station code), and thereafter stores the date/time at which the broadcast program starts, the time at which the broadcast program ends, and a VTR channel or position number corresponding to the VCR+ guide channel.

To convert the VCR+ guide channel into a corresponding VTR channel or position number, the VTR has a memory means for storing data representing the relationship between VCR+ guide channels and VTR channel or position numbers.

Figure 11:
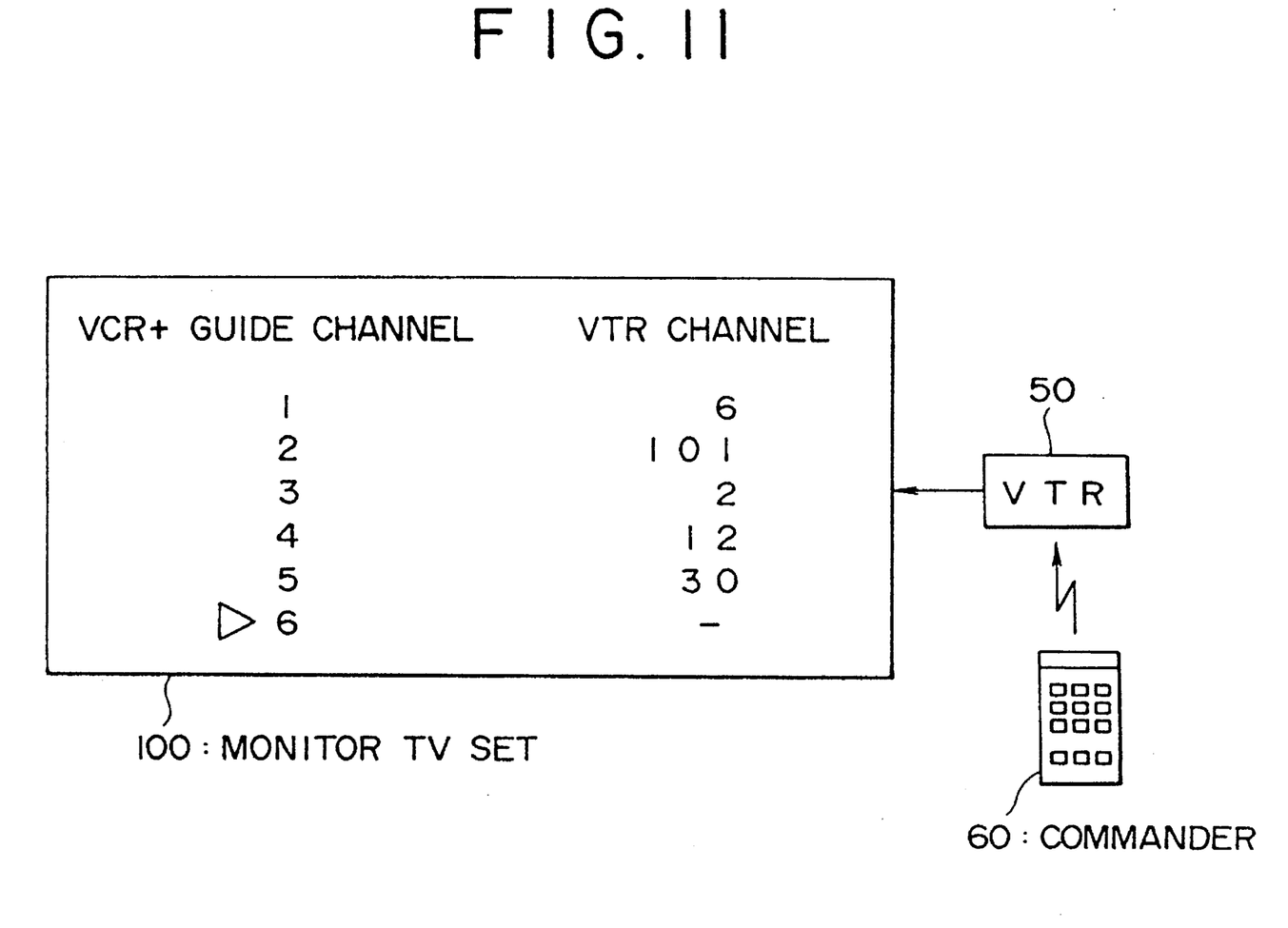
FIG. 11 is a diagram illustrative of a process of setting the corresponding relationship between VCR+ broadcasting codes and VTR channels.

As described above, the memory means is required to store data representing the relationship between VCR+ guide channels and VTR channel or position numbers. As shown in FIG. 11 of the accompanying drawings, a menu indicating such data is displayed on the screen of a monitor television set 100 by a VTR 50. While viewing the displayed menu, the user operates on keys of a remote control commander (transmitter) 60 or the VTR 50 itself to enter a channel number corresponding to a desired VCR+ guide channel. However, such a practice has been very cumbersome.

SUMMARY OF THE INVENTION

It is an object of the present invention to provide a recording apparatus which is capable of automatically setting data representing the corresponding relationship between channels selectable by a tuner and VCR+ guide channels.

According to the present invention, there is provided a recording apparatus comprising broadcasting station code detecting means for detecting first broadcasting station codes from television broadcast signals of channels selectable by a tuner, memory means for storing data representing the corresponding relationship between second broadcasting station codes and the first broadcasting station codes, and processing means for setting data representing the corresponding relationship between the channels selectable by the tuner and the second broadcasting station codes by using the first broadcasting station codes detected by the broadcasting station code detecting means and the data stored in the memory means. The recording apparatus may further comprise second memory means for storing the data set by the processing means.

According to the present invention, there is also provided a recording apparatus comprising a remotely controllable recorder and a remote control transmitter for remotely controlling the recorder, the recorder comprising broadcasting station code detecting means for detecting first broadcasting station codes from television broadcast signals of channels selectable by a tuner, first memory means for storing data representing the corresponding relationship between second broadcasting station codes and the first broadcasting station codes, and processing means for setting data representing the corresponding relationship between the channels selectable by the tuner and the second broadcasting station codes by using the first broadcasting station codes detected by the broadcasting station code detecting means and the data stored in the first memory means, the remote control transmitter having second memory means for storing the data set by the processing means.

According to the present invention, there is further provided a recording apparatus comprising a remotely controllable recorder and a remote control transmitter for remotely controlling the recorder, the recorder comprising broadcasting station code detecting means for detecting first broadcasting station codes from television broadcast signals of channels selectable by a tuner, first memory means for storing data representing the corresponding relationship between second broadcasting station codes and the first broadcasting station codes, processing means for setting data representing the corresponding relationship between the channels selectable by the tuner and the second broadcasting station codes by using the first broadcasting station codes detected by the broadcasting station code detecting means and the data stored in the first memory means, and second memory means for storing the data set by the processing means.

According to the present invention, there is also provided a method of setting channels of a tuner, comprising the steps of storing in a memory data representing the corresponding relationship between first broadcasting station codes and second broadcasting station codes, detecting first broadcasting station codes from television broadcast signals of channels selectable by a tuner, and setting data representing the corresponding relationship between the channels selectable by the tuner and the second broadcasting station codes by using the data stored in the memory. The method may further comprise the step of storing in a second memory data representing the corresponding relationship between the channels selectable by the tuner and the second broadcasting station codes.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Prior to describing preferred embodiments of the present invention, some terms used herein will be defined below.

Broadcasting station code (first broadcasting station code): This is a code contained in a broadcast signal and used to identify a broadcasting station which is transmitting the broadcast signal. One broadcasting station is assigned to one broadcasting station code.

Guide channel (second broadcasting station code): The guide channel is a number determined by a VCR+ code to identify a broadcasting station. One broadcasting station is assigned to one number.

Channel number: This is a number assigned to a broadcasting frequency.

Position number: This is a number assigned to a channel number. For example, position numbers may be assigned to channel numbers by the user as follows:

| Position numbers | Channel numbers |
| --- | --- |
| 1 | 41 |
| 2 | 30 |
| 3 | 21 |
| 4 | 46 |

Use of a position number facilitates the selection of a channel.

Figure 1:
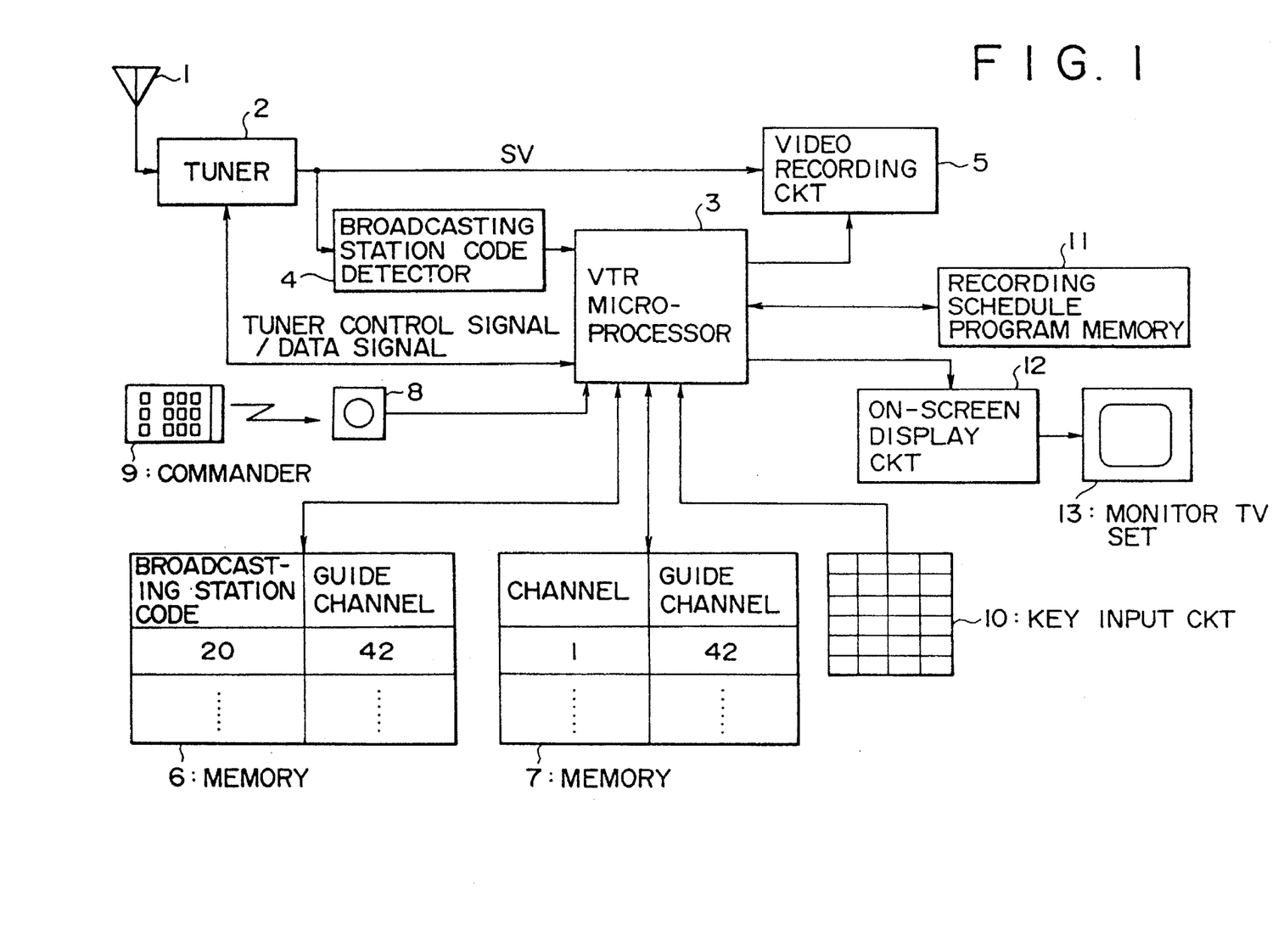
FIG. 1 is a block diagram of a recording apparatus according to an embodiment of the present invention.

FIG. 1 shows in block diagram, a recording apparatus, typically in the form of a video tape recorder (VTR) combined with a remote control commander, according to an embodiment of the present invention. The recording apparatus employs VPS data as broadcasting codes inserted in television broadcast signals.

Figure 4:
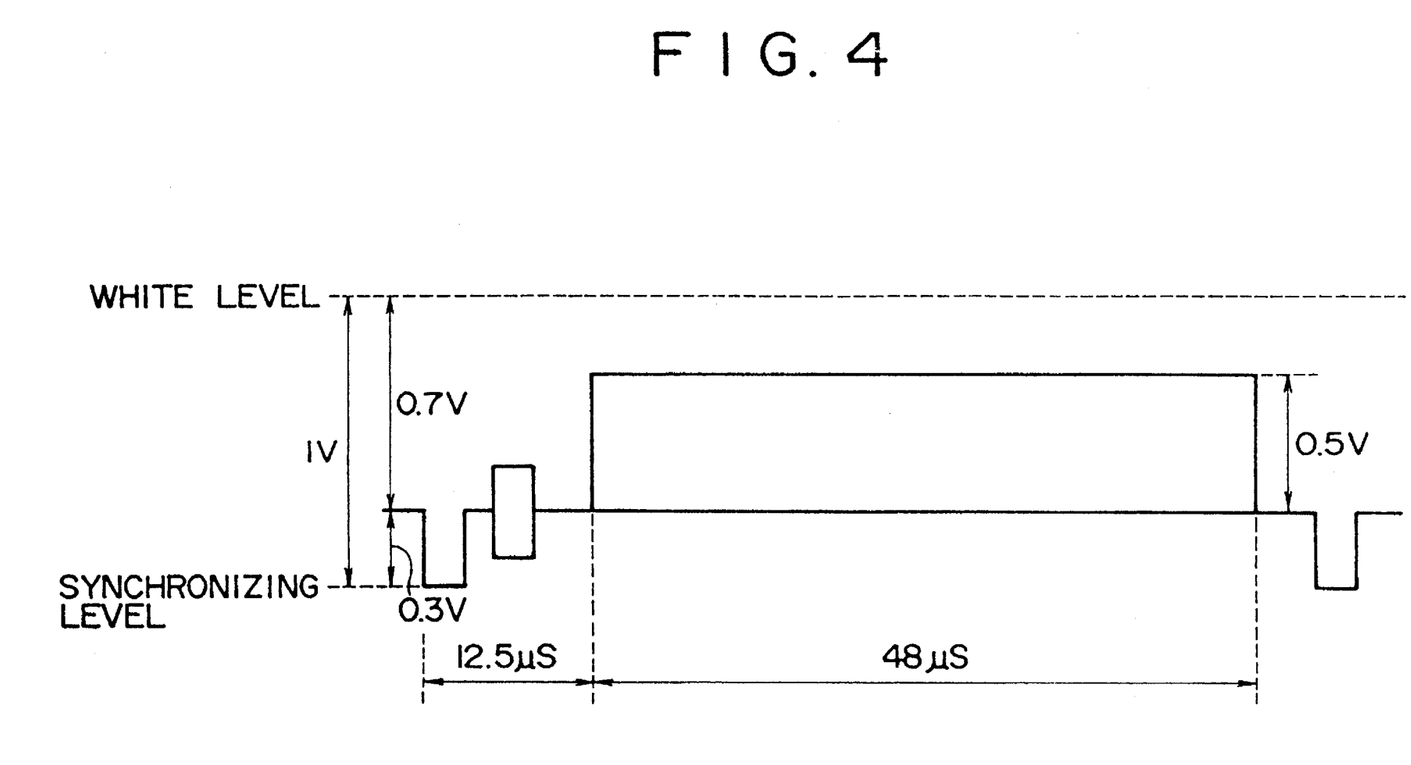
FIG. 4 is a diagram showing VPS data inserted in a vertical synchronizing interval of a television broadcast signal.

The VPS data will be described in detail below. Television broadcast signals in European countries including Germany, Austria, Switzerland, Netherlands, and neighboring countries capable of receiving broadcast radio waves from these European countries contain program information, called a VPS (Video Programming System), inserted in the 16th H of a vertical synchronizing interval of the television broadcast signal. FIG. 4 shows the signal format of VPS data.

Figure 5:
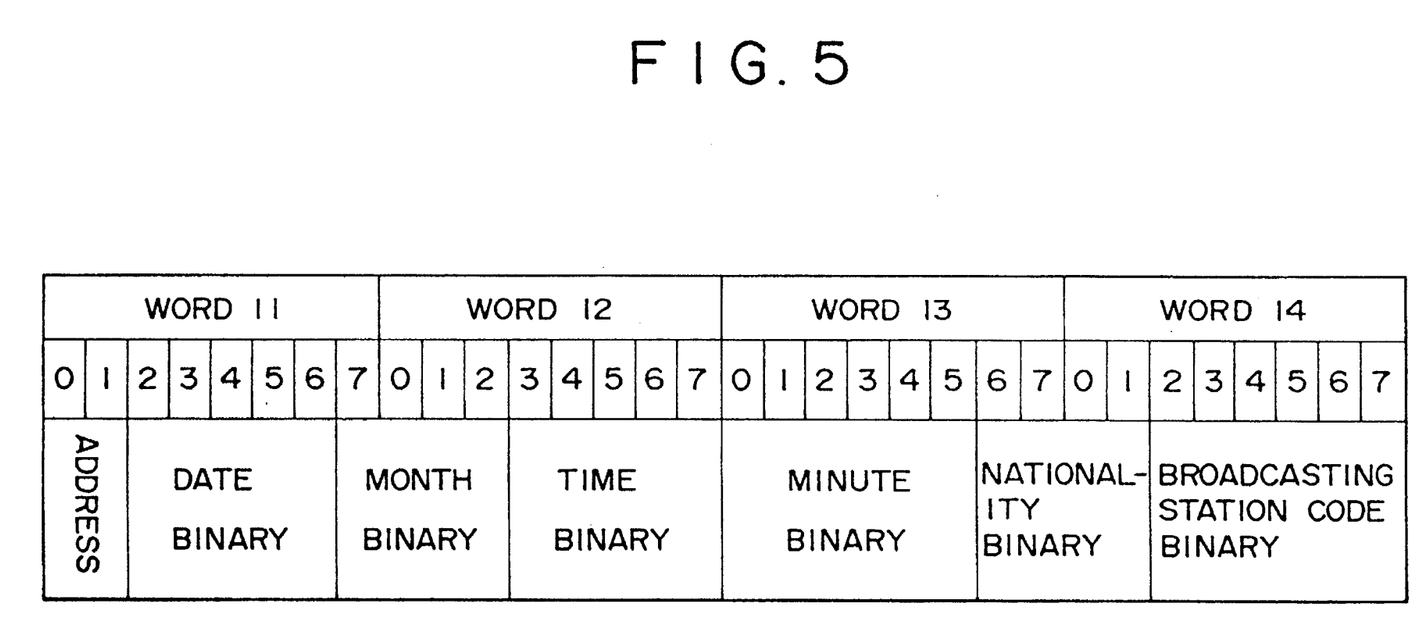
FIG. 5 is a diagram showing the VPS data in detail.

The VPS data includes a series of data composed of 15 words=120 bits (1 word=8 bits). The 1st word is a synchronizing signal called CRI (Clock Run In), and the 2nd word is a start code. Effective data is represented by the 3rd through 15th words. Actual program information is indicated by the 5th, and 11th through 14th words. These words are given the following meanings (see FIG. 5):

| 5th word: | Audio multiplex information | 2 bits |
| --- | --- | --- |
| 11th word: | Address information | 2 bits |
| | Information as to a date on which the broadcast program starts | 5 bits |
| | Information as to a month in which the broadcast program starts | 1 bit |
| 12th word: | Information as to a month in which the broadcast program starts | 3 bits |
| | Information as to a time at which the broadcast program starts | 5 bits |
| 13th word: | Information as to a minute at which the broadcast program starts | 6 bits |
| | Information as to the nationality of the broadcasting station | 2 bits |
| 14th word: | Information as to the nationality of the broadcasting station | 2 bits |
| | Information identifying the broadcasting station | 6 bits |

The recording apparatus shown in FIG. 1 will be described below. As shown in FIG. 1, a broadcast signal received by an antenna 1 is supplied to a tuner 2 including an intermediate-frequency amplifier, a video signal detector, etc. The tuner 2 is also supplied with a tuner control signal such as a station selection voltage from a VTR microprocessor 3. The tuner 2 supplies the VTR microprocessor 3 with a data signal such as an AFT signal.

The tuner 2 supplies an output video signal SV to a video recording circuit 5 and a broadcasting station code detector 4. The video recording circuit 5 is controlled in its operation by the VTR microprocessor 3. The broadcasting station code detector 4 extracts VPS data inserted in the 16th H of the vertical synchronizing interval of the video signal SV, and also detects the broadcasting station code represented by the 14th word (see FIG. 5). The broadcasting station code detected by the broadcasting station code detector 4 is supplied to the VTR microprocessor 3.

The recording apparatus also includes memories 6, 7. The memory 6 stores, in advance, data representing the corresponding relationship between broadcasting station codes that can be detected from the vertical synchronizing interval of the video signal SV and VCR+ guide channels. For example, the data representing the corresponding relationship between broadcasting station codes and VCR+ guide channels may be stored in the memory 6 when the recording apparatus is shipped from the factory. The memory 7 stores data representing the corresponding relationship between channels that can be selected by the tuner 2 and VCR+ guide channels upon automatic setting, as described later on.

An infrared radiation detector 8 is connected to the VTR microprocessor 3 for detecting an infrared remote control signal emitted from a remote control commander 9. The detected remote control signal is supplied from the infrared radiation detector 8 to the VTR microprocessor 3. To the VTR microprocessor 3, there is also connected a key input circuit 10 having keys which the user can press to send the same control signals as those which can be emitted from the remote control commander 9.

A recording schedule program memory 11 connected to the VTR microprocessor 3 stores programming information including a date/time at which a broadcast program starts, a time at which the broadcast program ends, and a channel when a recording schedule is programmed.

The VTR microprocessor 3 controls an on-screen display circuit 12 to control the display of information on a monitor television set 13.

Figure 2:
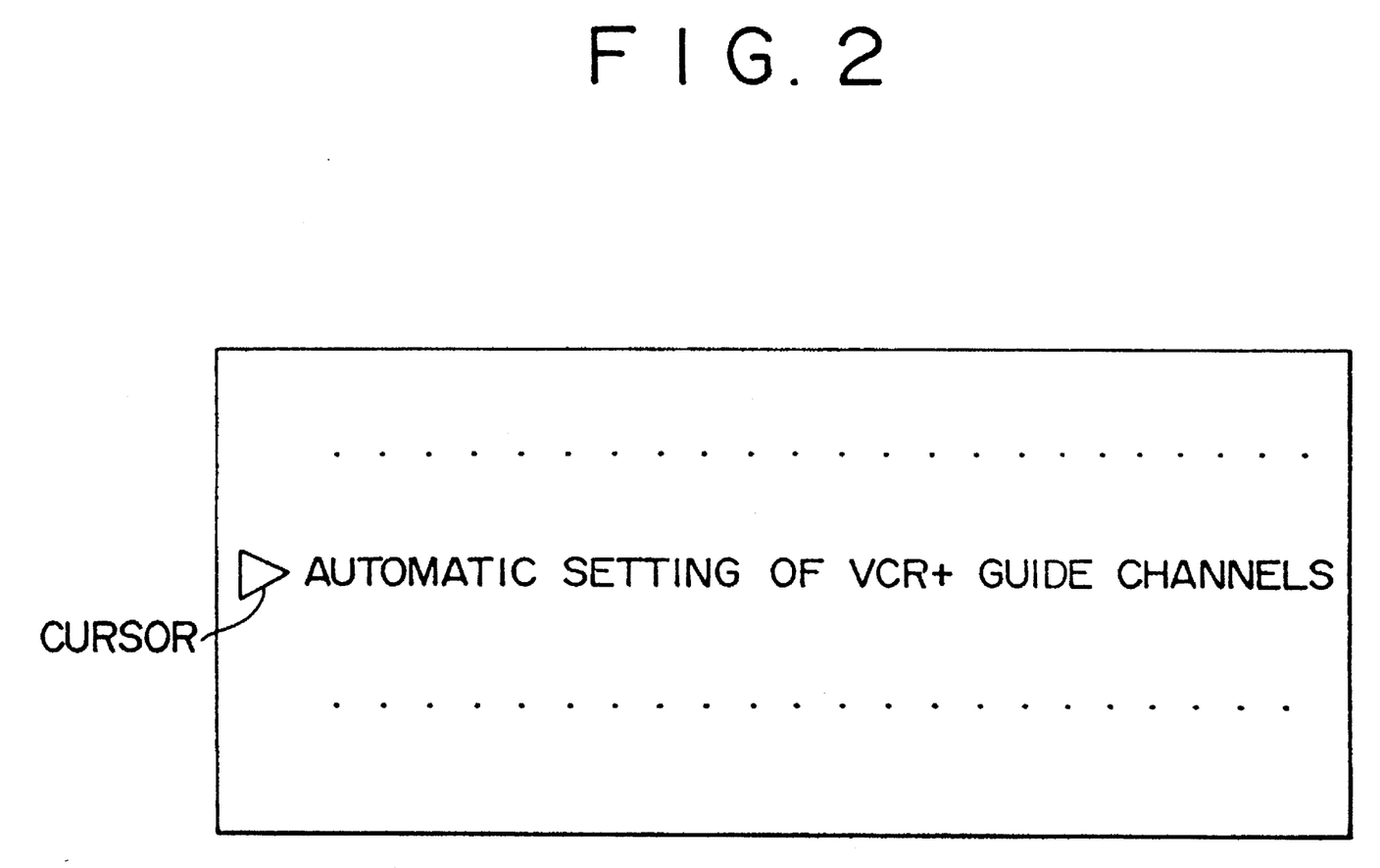
FIG. 2 is a view of a menu displayed on a monitor television set of the recording apparatus shown in FIG. 1.

When the user presses an automatic VCR+ guide channel setting key on the key input circuit 10 or an automatic VCR+ guide channel setting key on the remote control commander 9, a process of automatically setting a VCR+ guide channel is carried out. Alternatively, the user can execute a process of automatically setting a VCR+ guide channel by moving a displayed cursor to "AUTOMATIC VCR+ GUIDE CHANNEL SETTING" in a menu displayed on the screen of the monitor television set 13, with a key on the key input circuit 10 or the remote control commander 9, as shown in FIG. 2, and then pressing an execute key.

Figure 3:
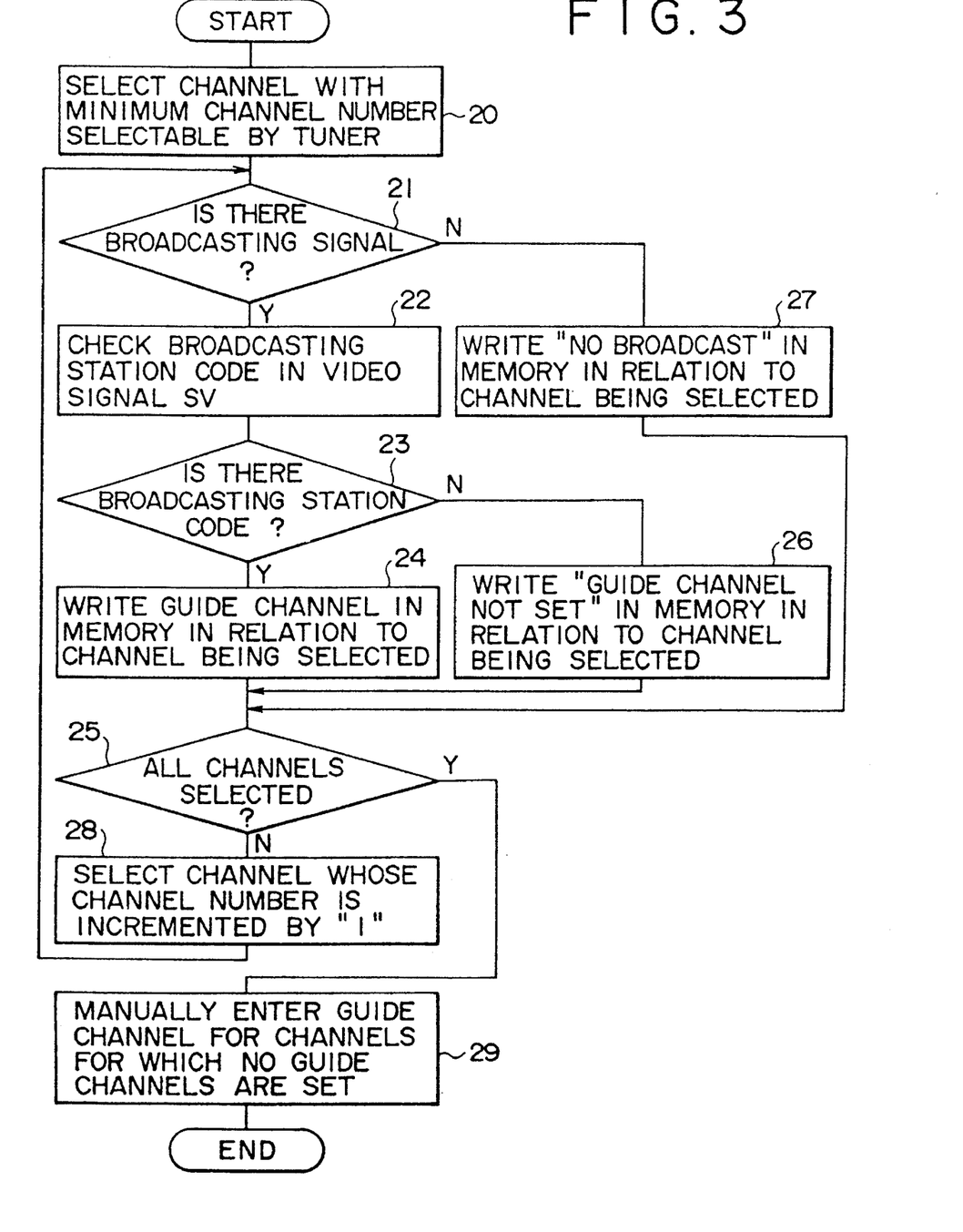
FIG. 3 is a flowchart of a sequence for automatically setting VCR+ guide channels with the recording apparatus shown in FIG. 1.

The process of automatically setting a VCR+ guide channel is carried out according to the flowchart of FIG. 3.

First, the VTR microprocessor 3 controls the tuner 2 to select a channel of a smallest channel number that the tuner 2 can select in a step 20. Then, control goes to a step 21.

In the step 21, the VTR microprocessor 3 determines whether there is a broadcast signal in the selected channel based on a data signal from the tuner 2. If there is a broadcast signal, then the VTR microprocessor 3 checks a broadcasting station code in the video signal SV based on a detected output signal from the broadcasting station code detector 4 in a step 22, after which control goes to a step 23.

In the step 23, the VTR microprocessor 3 determines whether there has been a broadcasting station code. If there has been a broadcasting station code, then the VTR microprocessor 3 reads a guide channel corresponding to the detected broadcasting station code out of the memory 6 based on the data, stored in the memory 6, which represents the corresponding relationship between broadcasting station codes and VCR+ guide channels. Then, the VTR microprocessor 3 writes the guide channel in the memory 7 in relation to the channel that is being selected in a step 24. Thereafter, control goes to a step 25.

If there has been no broadcasting station code, then the VTR microprocessor 3 writes data representing "GUIDE CHANNEL NOT SET" in the memory 7 in relation to the channel that is being selected in a step 26. Thereafter, control goes to the step 25.

If there is no broadcast signal in the step 21, then the VTR microprocessor 3 writes data representing "NO BROADCAST" in the memory 7 in relation to the channel that is being selected in a step 27. Thereafter, control goes to the step 25.

In the step 25, the VTR microprocessor 3 determines whether all channels have been selected. If all channels have not been selected, then the VTR microprocessor 3 controls the tuner 2 to select a channel whose channel number is incremented by "1" in a step 28. Thereafter, control returns to the step 21.

If all channels have been selected in the step 25, then control proceeds to a step 29 in which the VTR microprocessor 3 displays channels for which guide channels are not set, one by one on the monitor television set 13, and prompts the user to enter guide channels using the key input circuit 10 or the remote control commander 9. Thereafter, the automatic setting process is ended.

In the above automatic setting process, the memory 7 thus stores data representing the corresponding relationship between channels selectable by the tuner 2 and VCR+ guide channels.

A recording schedule is programmed using a VCR+ code as follows: When a VCR+ code for a broadcast program whose recording schedule is to be programmed is entered by the key input circuit 10 or the remote control commander 9, the VTR microprocessor 3 decodes the VCR+ code to obtain a date/time at which the broadcast program starts, a time at which the broadcast program ends, and a VCR+ guide channel, and thereafter writes the date/time at which the broadcast program starts, the time at which the broadcast program ends, and a VTR channel or position number corresponding to the VCR+ guide channel in the recording schedule program memory 11. To convert the VCR+ guide channel into a channel selectable by the tuner 2, the VTR microprocessor 3 refers to the data representing the corresponding relationship between channels selectable by the tuner 2 and VCR+ guide channels.

Since the data representing the corresponding relationship between channels selectable by the tuner 2 and VCR+ guide channels are automatically stored in the memory 7, the user is not required to take the trouble of setting such data.

In the embodiment shown in FIG. 1, the channel number varies successively from the minimum value to the maximum value in the automatic setting process. However, the channel number may vary in any sequence insofar as all channels are eventually selected. The user may enter channels, for which guide channels are to be set, one by one using the remote control commander 9 or the key input circuit 10. The remote control commander 9 emits an infrared signal to the VTR in the illustrated embodiment. However, the remote control commander 9 may emit an ultrasonic signal, an RF signal, or the like, or may transmit an electric signal if it is a wired remote control commander.

A recording apparatus according to another embodiment will be described below with reference to FIGS. 6 and 7. Those parts shown in FIGS. 6 and 7 which are identical to those shown in FIG. 1 are denoted by identical reference numerals, and will not be described in detail below.

Figure 7:
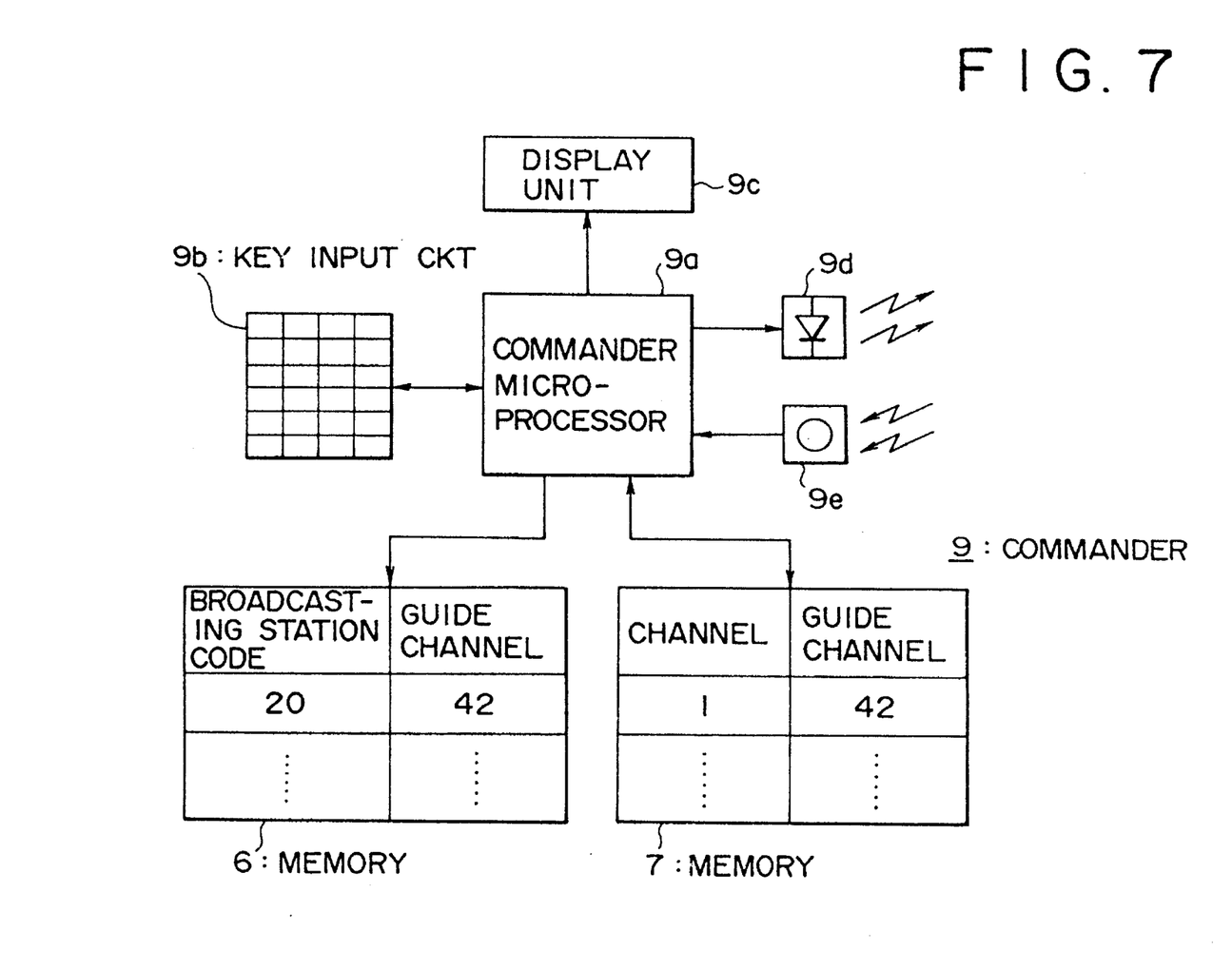
FIG. 7 is a block diagram of a remote control commander of the recording apparatus shown in FIG. 6.

In this embodiment, as shown in FIG. 7, a remote control commander 9 has a memory 6 for storing data representing the corresponding relationship between broadcasting station codes and VCR+ guide channels, and a memory 7 for storing data representing the corresponding relationship between channels that can be selected by the tuner 2 and VCR+ guide channels.

Figure 6:
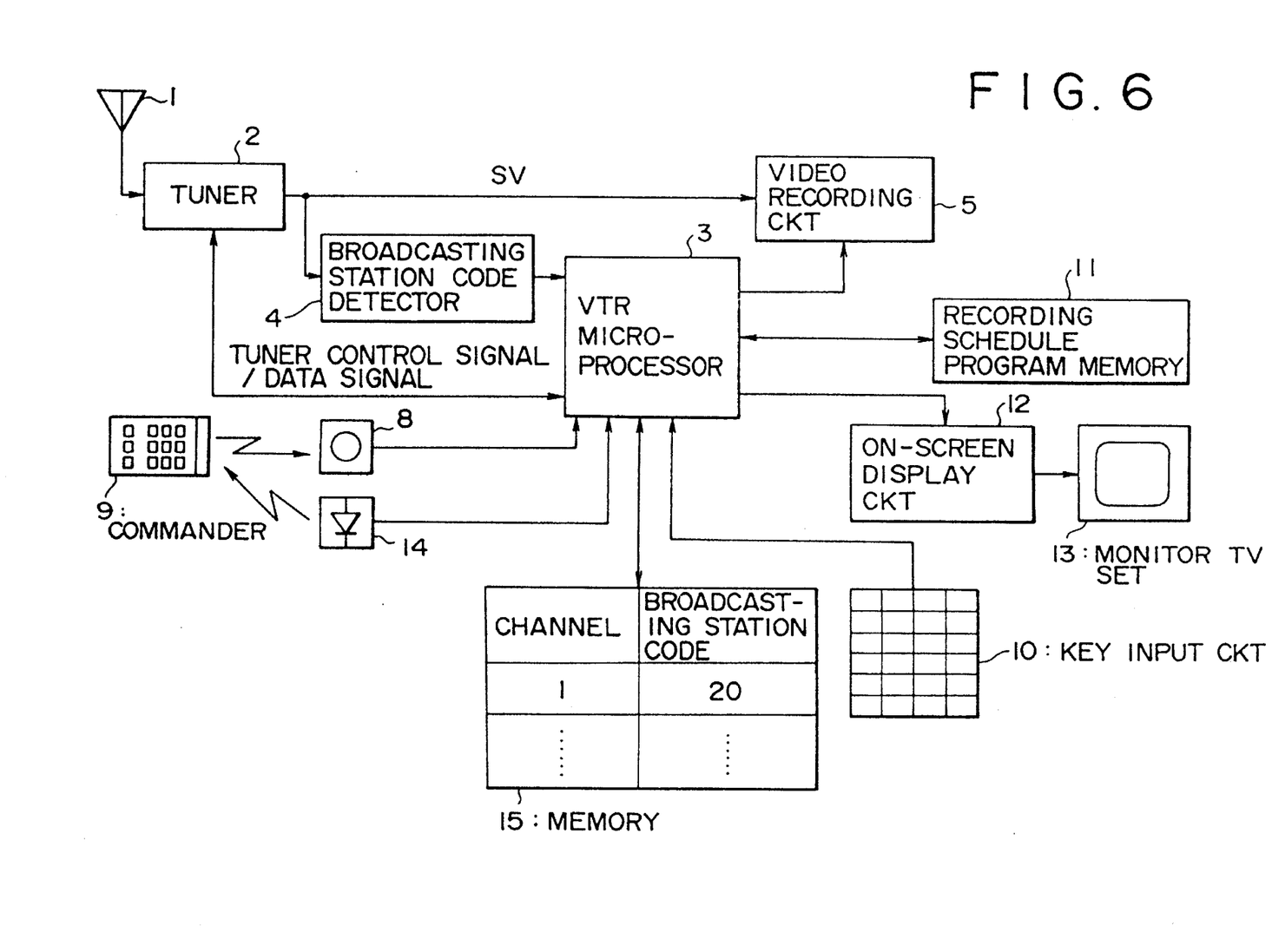
FIG. 6 is a block diagram of a recording apparatus according to another embodiment of the present invention.

As shown in FIG. 6, an infrared radiation emitter 14, which is connected to the VTR microprocessor 3, emits an infrared signal to the remote control commander 9. There is a memory 15 for storing data representing the corresponding relationship between channels that can be selected by the tuner 2 and broadcasting station codes. The other details of the recording apparatus shown in FIG. 6 are the same as those of the recording apparatus shown in FIG. 1.

In FIG. 7, the remote control commander 9 comprises a microprocessor 9a to which the memories 6, 7 are connected, a key input circuit 9b connected to the microprocessor 9a, a display unit 9c, which may be a liquid crystal display panel, connected to the microprocessor 9a, an infrared radiation emitter 9d connected to the microprocessor 9a for emitting an infrared signal to the VTR, and an infrared radiation detector 9e connected to the microprocessor 9a for detecting an infrared signal from the VTR.

When the user presses an automatic VCR+ guide channel setting key on the key input circuit 9b of the remote control commander 9, a process of automatically setting VCR+ guide channels is carried out.

Figure 8:
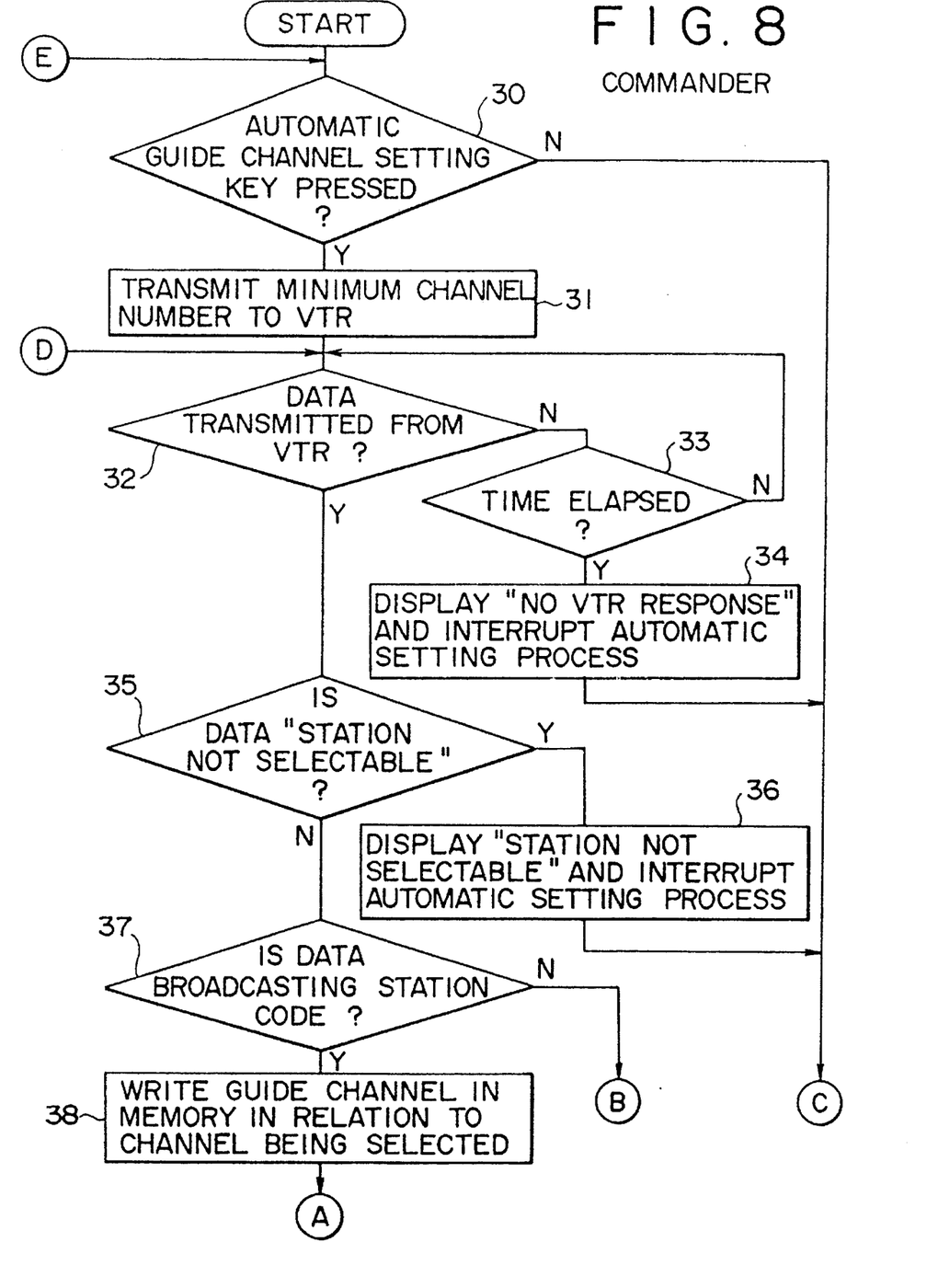
FIGS. 8 and 9 are a flowchart of a sequence for automatically setting VCR+ guide channels on the remote control commander with the recording apparatus shown in FIG. 6.
Figure 9:
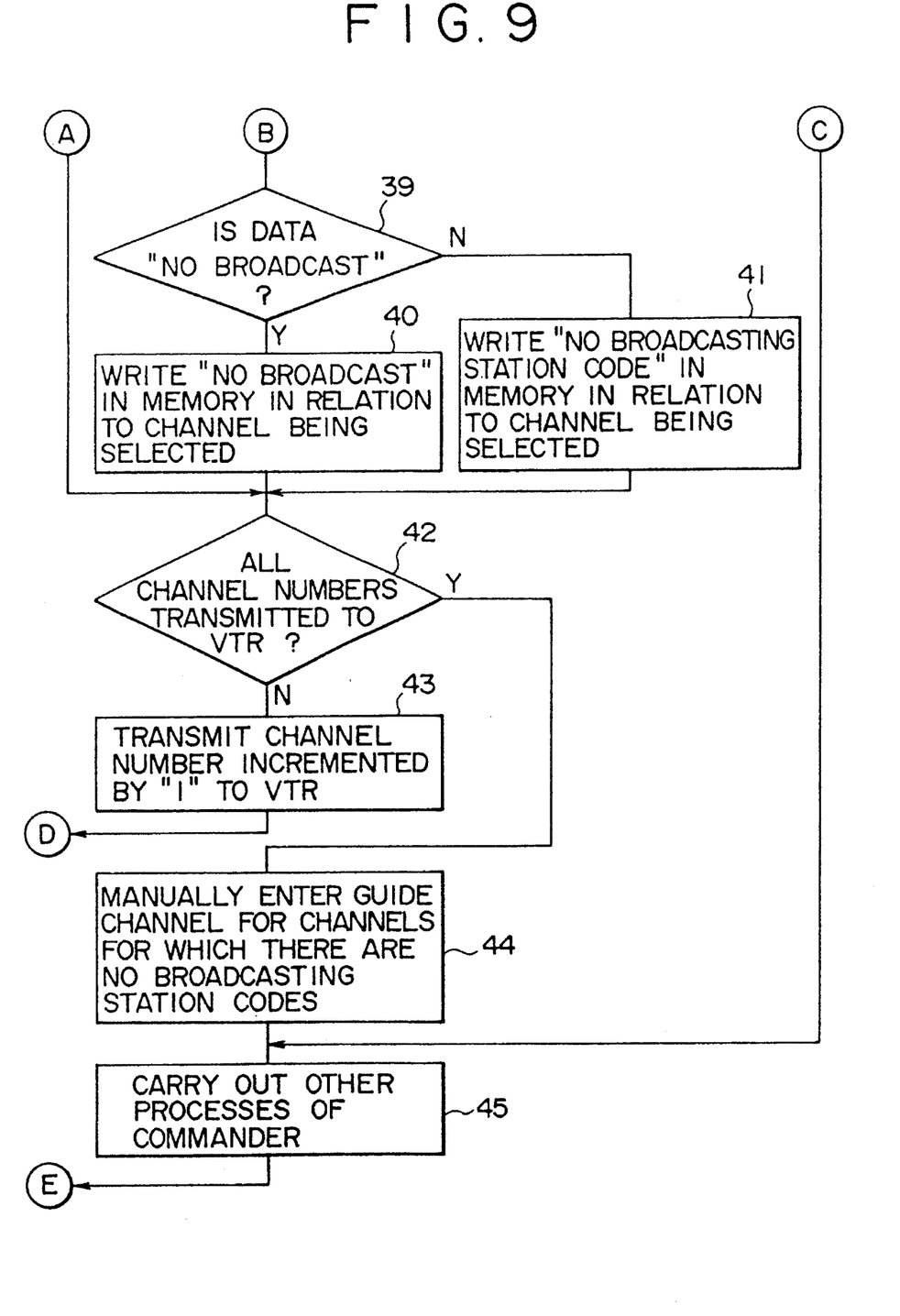

FIGS. 8 and 9 illustrate a sequence for automatically setting VCR+ guide channels on the remote control commander with the recording apparatus shown in FIG. 6.

First, the microprocessor 9a determines whether the automatic VCR+ guide channel setting key on the key input circuit 9b of the remote control commander 9 is pressed or not in a step 30. If not, then control proceeds to a step 45.

If the automatic VCR+ guide channel setting key is pressed in the step 30, data indicative of a minimum channel number of channels that are selectable by the tuner 2 is transmitted from the infrared radiation emitter 9d to the VTR in a step 31.

Then, the microprocessor 9a determines whether data is transmitted from the VTR through the infrared radiation detector 9e or not in a step 32. If not, then the microprocessor 9a determines whether a certain period of time has elapsed or not in a step 33. If not elapsed, then control returns to the step 32.

If elapsed, then the microprocessor 9a displays data "NO VTR RESPONSE" on the display unit 9c, and interrupts the automatic setting process in a step 34, after which control goes to the step 45.

If data is transmitted from the VTR in the step 32, then the microprocessor 9a determines whether the data represents "STATION NOT SELECTABLE" or not in a step 35. If the data represents "STATION NOT SELECTABLE", then the microprocessor 9a displays data "STATION NOT SELECTABLE" on the display unit 9c, and interrupts the automatic setting process in a step 36, after which control goes to the step 45.

If the data does not represent "STATION NOT SELECTABLE" in the step 35, then the microprocessor 9a determines whether the data is a broadcasting station code or not in a step 37. If the data is a broadcasting station code, then the microprocessor 9a reads a guide channel corresponding to the detected broadcasting station code out of the memory 6 based on the data, stored in the memory 6, which represents the corresponding relationship between broadcasting station codes and VCR+ guide channels. Then, the microprocessor 9a writes the guide channel in the memory 7 in relation to the channel that is being selected in a step 38. Thereafter, control goes to a step 42.

If the data is not a broadcasting station code in the step 37, then the microprocessor 9a determines whether the data is representative of "NO BROADCAST" or not in a step 39. If the data represents "NO BROADCAST", then the microprocessor 9a writes data representing "NO BROADCAST" in the memory 7 in relation to the channel that is being selected in a step 40. Thereafter, control goes to the step 42. If the data does not represent "NO BROADCAST" then the microprocessor 9a writes data representing "NO BROADCASTING STATION CODE" in the memory 7 in relation to the channel that is being selected in a step 41. Thereafter, control goes to the step 42.

In the step 42, the microprocessor 9a determines whether the channel numbers of all channels have been transmitted to the VTR or not. If the channel numbers of all channels have not been transmitted, then the microprocessor 9a transmits a channel number incremented by "1" through the infrared radiation emitter 9d to the VTR in a step 43, and control returns to the step 32.

If the channel numbers of all channels have been transmitted in the step 42, then control proceeds to a step 44 in which the microprocessor 9a displays channels for which there are no broadcasting station codes, one by one on the display unit 9c, and prompts the user to enter guide channels using the key input circuit 9b. Thereafter, the automatic setting process is ended, and control goes to a step 45.

In the step 45, the processor 9a carries out other processes of the remote control commander 9. Then, control goes back to the step 30.

Figure 10:
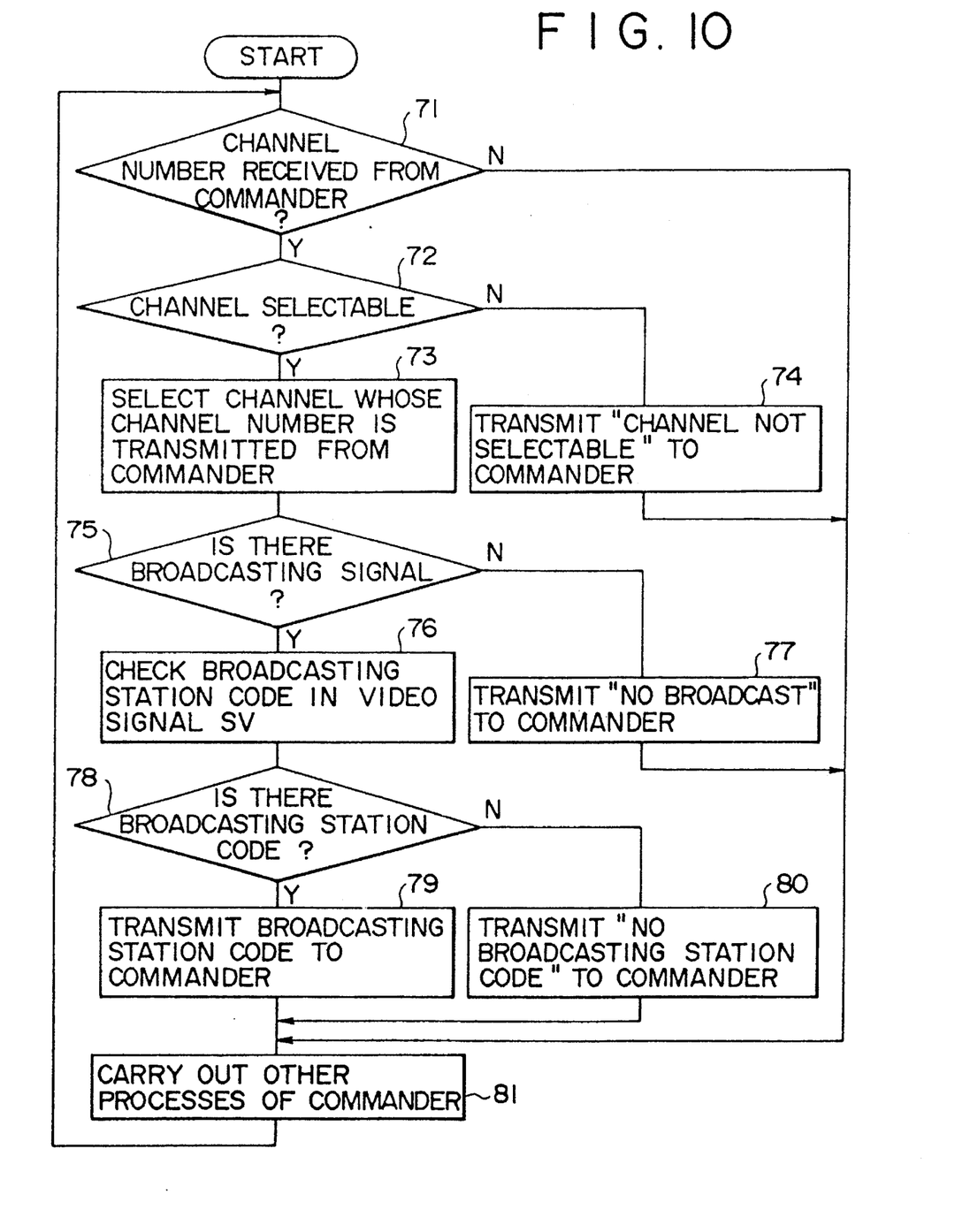
FIG. 10 is a flowchart of a sequence for automatically setting VCR+ guide channels on a VTR with the recording apparatus shown in FIG. 6.

FIG. 10 shows the manner in which the VTR operates in a process of automatically setting VCR+ guide channels.

First, the VTR microprocessor 3 determines whether a channel number is received from the remote control commander 9 through the infrared radiation detector 8 in a step 71. If not received, control goes to a step 81.

If received, then the VTR microprocessor 3 determines whether a channel can be selected at present or not in a step 72. If not, the VTR microprocessor 3 transmits data representing "CHANNEL NOT SELECTABLE" through the infrared radiation emitter 14 to the remote control commander 9 in a step 74. Thereafter, control jumps to the step 81.

If a channel is selectable in the step 72, then the VTR microprocessor 3 controls the tuner 2 to select a channel whose channel number has been transmitted from the remote control commander 9 in a step 73, which is followed by a step 75.

In the step 75, the VTR microprocessor 3 determines whether there is a broadcast signal in the selected channel based on a data signal from the tuner 2. If there is no broadcast signal, then the VTR microprocessor 3 transmits data representing "NO BROADCAST" through the infrared radiation emitter 14 to the remote control commander 9 in a step 77. Thereafter, control goes to the step 81. If there is a broadcast signal, then the VTR microprocessor 3 checks a broadcasting station code in the video signal SV based on a detected output signal from the broadcasting station code detector 4 in a step 76, after which control goes to a step 78.

In the step 78, the VTR microprocessor 3 determines whether there has been a broadcasting station code. If there has been a broadcasting station code, then the VTR microprocessor 3 transmits the broadcasting station code through the infrared radiation emitter 14 to the remote control commander 9 in a step 79. Then control goes to the step 81.

If there has been no broadcasting station code in the step 78, then the VTR microprocessor 3 transmits data indicating "NO BROADCASTING STATION CODE" through the infrared radiation emitter 14 to the remote control commander 9 in a step 80. Then control goes to the step 81.

In the step 81, the VTR microprocessor 3 carries out other processes of the VTR. Then, control goes back to the step 71.

In the above operation, the memory 7 of the remote control commander 9 thus stores data representing the corresponding relationship between channels selectable by the tuner 2 and VCR+ guide channels.

According to this embodiment, a recording schedule is programmed using a VCR+ code as follows: When a VCR+ code for a broadcast program whose recording schedule is to be programmed is entered by the remote control commander 9, the microprocessor 9a decodes the VCR+ code to obtain a date/time at which the broadcast program starts, a time at which the broadcast program ends, and a VCR+ guide channel. Then, the microprocessor 9a converts the VCR+ guide channel into a channel selectable by the tuner 2 by referring to the data, which is stored in the memory 7, representing the corresponding relationship between channels selectable by the tuner 2 and VCR+ guide channels. Then, the microprocessor 9a transmits data representing the date/time at which the broadcast program starts, the time at which the broadcast program ends, and the guide channel selectable by the tuner 2 through the infrared radiation emitter 9d to the VTR. The VTR microprocessor 3 then writes the transmitted data in the recording schedule program memory 11.

When a VCR+ code for a broadcast program whose recording schedule is to be programmed is entered by the key input circuit 10, the VTR microprocessor 3 decodes the VCR+ code to obtain a date/time at which the broadcast program starts, a time at which the broadcast program ends, and a VCR+ guide channel. Then, the VTR microprocessor 3 transmits the data of the VCR+ guide channel through the infrared radiation emitter 14 to the remote control commander 9. The microprocessor 9a of the remote control commander 9 converts the VCR+ guide channel into a channel selectable by the tuner 2 by referring to the data, which is stored in the memory 7, representing the corresponding relationship between channels selectable by the tuner 2 and VCR+ guide channels. Then, the microprocessor 9a transmits channel data through the infrared radiation emitter 9d to the VTR. The VTR microprocessor 3 then writes the data, representing the date/time at which the broadcast program starts, the time at which the broadcast program ends, and the guide channel, in the recording schedule program memory 11.

Since the data representing the corresponding relationship between channels selectable by the tuner 2 and VCR+ guide channels are automatically stored in the memory 7 of the remote control commander 9, the user does not have to set such data.

In the embodiment shown in FIGS. 6 and 7, the channel number varies successively from the minimum value to the maximum value and is transmitted to the VTR by the microprocessor 9a of the remote control commander 9 in the automatic setting process. However, the channel number may vary in any sequence insofar as all channels are eventually selected. The user may enter channels, for which guide channels are to be set, one by one using the key input circuit 9b of the remote control commander 9. The remote control commander 9 employs infrared radiation signals for bidirectional communications between the remote control commander 9 and the VTR. However, such bidirectional communications may be carried out using an ultrasonic signal, an RF signal, or the like, or using an electric signal if it is a wired remote control commander. A wired remote control commander may be used only in the automatic setting process.

The VTR microprocessor 3 controls the tuner 2 to select a channel whose channel number has been transmitted from the remote control commander 9, and the broadcasting station code detector 4 detects a broadcasting station code. However, as shown in FIG. 6, with the VTR having the memory 15 for storing data representing the corresponding relationship between channels that can be selected by the tuner 2 and broadcasting station codes, a channel may not be selected by the tuner 2, and a broadcasting station code may be determined and transmitted to the remote control commander 9.

The remote control commander 9 transmits channel numbers, one by one, to the VTR. However, the remote control command 9 may transmit all channel numbers at once, and may receive result data indicative of whether there is a broadcasting station code or not from the VTR.

In the above embodiments, broadcasting station codes are detected from VPS data inserted in a vertical synchronizing interval of a television broadcast signal. However, EDS data in the United States, or PDC data in England, or character-multiplexed broadcast data may be detected and used to detect broadcasting station codes.

With the present invention, broadcasting station codes detected by the broadcasting code detecting means and the corresponding relationship, stored in the memory means, between VCR+ guide channels and broadcasting station codes are used for the processing means to automatically set the corresponding relationship between channels selectable by the tuner and VCR+ guide channels. Thus, it is not necessary for the user to take the trouble of setting the corresponding relationship.

Although certain preferred embodiments of the present invention have been shown and described in detail, it should be understood that various changes and modifications may be made therein without departing from the scope of the appended claims.

What is claimed is:

1. A recording apparatus comprising:

broadcasting station code detecting means for detecting a first broadcasting station code from a television broadcast signal of a channel selected by a tuner;

user means for entering an automatic-set-codes command and for entering a VCR+ code corresponding to a broadcast for recording, the VCR+ code having an embedded second broadcasting station code;

first memory means for storing first data representing a first corresponding relationship between first broadcasting station codes and respective second broadcasting station codes;

second memory means; and processing means for automatically setting second data representing a second corresponding relationship between channels selectable by the tuner and respective second broadcasting station codes by using respective first broadcasting station codes detected by said broadcasting station code detecting means and the first data stored in said first memory means in response to the automatic-set-codes command entered by a user using said user means for storing the second data in said second memory means and for automatically decoding the VCR+ code having the embedded second broadcasting station code and converting the decoded second broadcasting station code to a channel to be selected by the tuner by using the second data in said second memory means.

2. A recording apparatus comprising a remotely controllable recorder and a remote control transmitter for remotely controlling the recorder;

said recorder comprising:

broadcasting station code detecting means for detecting a first broadcast station code from a television broadcast signal of a channel selected by a tuner;

said remote control transmitter comprising:

first memory means for storing first data representing a first corresponding relationship between first broadcast station codes and respective second broadcast station codes;

user input means for entering an automatic-set-codes command and for entering a VCR+ code corresponding to a broadcast for recording, the VCR+ code having an embedded second broadcasting station code;

second memory means; and processing means for automatically setting second data representing a second corresponding relationship between channels selectable by the tuner and respective second broadcast station codes by using respective first broadcast station codes detected by said broadcasting station code detecting means and the first data stored in said first memory means in response to the automatic-set-codes command entered by a user using said user input means for storing the second data in said second memory means, for automatically decoding the VCR+ code having the embedded second broadcasting station code, and for converting the decoded second broadcasting station code to a channel to be selected by the tuner by using the second data in said second memory means.

3. A recording apparatus comprising a remotely controllable recorder and a remote control transmitter for remotely controlling the recorder;

said recorder comprising:

broadcasting station code detecting means for detecting a first broadcasting station code from a television broadcast signal of a channel selected by a tuner;

first memory means for storing first data representing a first corresponding relationship between first broadcasting station codes and respective second broadcasting station codes;

second memory means; and processing means for automatically setting second data representing a second corresponding relationship between channels selectable by the tuner and respective second broadcasting station codes by using respective first broadcasting station codes detected by said broadcasting station code detecting means and the first data stored in said first memory means in response to an automatic-set-codes command from a user using the remote control transmitter for storing the second data in said second memory means, for automatically decoding a VCR+ code entered by the user using the remote control transmitter which corresponds to a broadcast for recording and which has an embedded second broadcasting station code, and for converting the decoded second broadcasting station code to a channel to be selected by the tuner by using the second data in said second memory means.

4. A method of setting channels of a tuner, comprising the steps of:

storing in a first memory first data representing a first corresponding relationship between first broadcasting station codes and respective second broadcasting station codes;

detecting a first broadcasting station code from a television broadcast signal of a channel selected by a tuner;

automatically setting second data representing a second corresponding relationship between channels selectable by the tuner and respective second broadcasting station codes by using the first data stored in the first memory in response to an automatic-set-codes command by a user, and storing the second data in a second memory; and automatically decoding a VCR+ code entered by the user which corresponds to a broadcast for recording and which has an embedded second broadcasting station code and converting the decoded second broadcasting station code to a channel to be selected by the tuner by using the second data in the second memory.

* * * * *